July 4, 1939.  J. M. CHRISTMAN  2,164,570
CUTTING TOOL
Filed Nov. 14, 1936
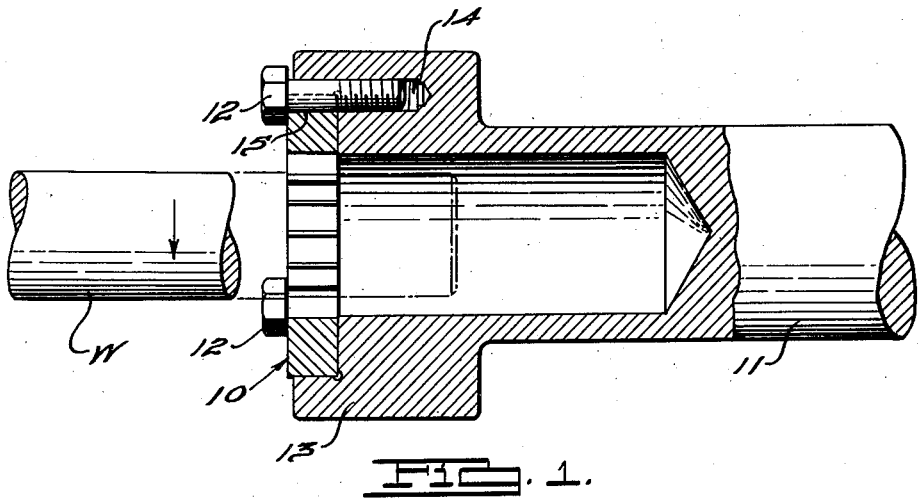
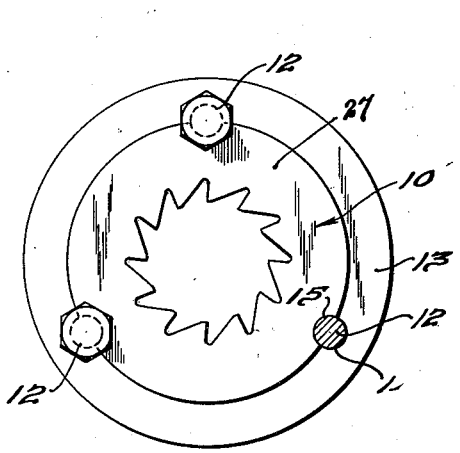
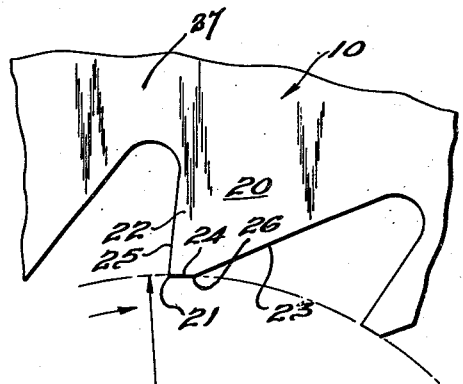
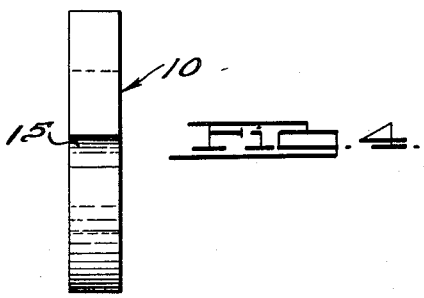
INVENTOR.
John M. Christman.
BY Tibbetts + Hart
ATTORNEYS.

Patented July 4, 1939

2,164,570

UNITED STATES PATENT OFFICE 2,164,570

CUTTING TOOL

John M. Christman, Detroit, Mich., assignor to Packard Motor Car Company, Detroit, Mich., a corporation of Michigan Application November 14, 1936, Serial No. 110,827

7 Claims. (Cl. 29—103)

This invention relates to cutting tools and to the method of forming and sharpening the cutters or cutting members thereof.

In reducing a piece of work to circular form of desired diameter, it is now customary to employ a cutting tool having one or more teeth with a cutting end individually ground at an angle to form a relief for the cutting edge. It is difficult to obtain a smooth finish with teeth of this kind. Very accurate grinding is required if the tool is to run fairly true and this makes it a very costly operation. Similar conditions exist in resharpening the tool and likewise such operations are very costly.

One of the objects of the present invention is to provide a cutting tool that will produce a smoother circumferential surface on a piece of work, particularly when taking a heavy cut, than is possible with previously known cutting tools.

Another object of the invention is to provide a tool that will produce a more nearly accurate circumferential surface on a piece of work than is possible with previously known tools.

Another object of the invention is to provide a tool, for reducing the circumferential surface of work, that is cheaper to make and to resharpen and which therefore may be used in a more nearly sharp condition than previous similar tools without increasing tool cost.

Another object of the invention is to provide a cutter, for reducing the circumferential diameter of a piece of work, having internal tooth cutting corners that will take a large chip and at the same time produce a smooth surface to accurate size.

Another object of the invention is to materially reduce the cost of decreasing the circumferential diameter of work by providing a cutter having internal teeth with end cutting edges, all of which can be sharpened by a single grinding operation.

Another object of the invention is to provide a cutter for decreasing the circumferential diameter of a piece of work having internal teeth having end cutting edges so formed that a number of such cutters can be held and said cutting edges sharpened or resharpened by a surface grinding operation.

Another object of the invention is to reduce the present initial sharpening and resharpening cost of tools for reducing diameters by providing an internally toothed annulus that can be ground across one or both sides to sharpen the cutting edges.

Another object of the invention is to provide a method of forming cutting members of tools, for reducing diameters, at a low cost.

Other objects of the invention will appear from the following description taken in connection with the drawing, which forms a part of this specification, and in which:

Fig. 1 is a view, partly in section, of a tool constructed in accordance with the invention and in cutting relation with a piece of work;

Fig. 2 is an elevational view of the tool with the work removed;

Fig. 3 is a fragmentary elevational view of the cutter showing some teeth several times enlarged;

Fig. 4 is an elevational view of the cutter member looking at the outer circumference.

Referring to the drawing, the cutter member of the tool is indicated generally at 10 and it is mounted upon a bar or support 11 as by bolts 12. The cutter is in the form of an annulus and the support is hollow at one end and formed with a recessed head 13 in which the cutter is adapted to be seated. The wall of the support head is formed with axially extending bolt receiving openings 14 that intersect the inner circumferential wall of the head and the cutter is formed with peripheral recesses 15 adapted to be placed in complementary relation with the portions of the openings 14 intersecting the head. The bolts extend through such complementary recessed portions of the head and cutter and are screwed into the openings 14. The heads of the bolts will thus clamp the cutter against the supporting head in fixed axial relation and the bolt shanks will prevent rotative movement of the cutter relative to the supporting head.

The work upon which the cutting tool is operating is indicated at W, and the tool is shown as reducing the diameter of the work. In the present showing of the invention the supporting member 11 carrying the cutter is suitably mounted in a fixed position while the work is suitably rotated and moved axially toward and away from the cutter. However, the work could be held stationary and the tool rotated and moved axially relative thereto.

The cutter or cutting member 10 is, as previously related, preferably in the form of an annulus and of a width about one-fifth or one-sixth its diameter. It may be even thinner than this, depending largely upon how it is made, that is, whether by stamping it out of sheet metal or forming it from bar stock, and then cutting the individual cutters from the bar. If the teeth of the cutter are to be formed in the annulus after stamping or cutting, several of them may be mounted together so that they can all be treated alike in each operation of tooth forming apparatus. The teeth may be evenly spaced, or a slight uneveness may be effected, to prevent chatter against the work.

The shape of the teeth of this cutter is best illustrated in Fig. 3 where the teeth are greatly enlarged. The teeth project inwardly and form the inner circumference of the annulus and they extend entirely across the axial length of the annulus, that is, the full width of the cutter illustrated. These teeth may extend parallel to the axis of the annulus or they may be spiraled. The cutter teeth are indicated generally by the numeral 20 and the cutting corner of each tooth is indicated at 21. It is the formation of these corners and adjacent parts of the teeth that is of importance in this tool.

In previous tools the leading end of each tooth is cut at an angle or relieved immediately back from the cutting edge, and this of course requires individual grinding of each tooth end. It is almost impossible to so grind that these cutting edges will be exactly in a plane normal to the axis of the tool, and if they are not there is bound to be cocking of the work in its operation and resulting in inaccurate circumference.

Also, with the relieved form of tooth, and when the work is pressed forward into the cutter, there is a line contact of the forward cutting edge of the tooth with the work, and slight pressure on the work causes the cutting edge to dig in. This "digging in" upsets the accuracy of the operation and a rough or inaccurate surface is produced, particularly when there are relatively soft spots in the work. In the present invention the front, or leading end of the tooth, is ground normal to the axis of the annulus and the front end of every tooth of the cutter is in this plane, so that the cutting end of every tooth has an equal pressure against the work, not with a line contact, but with a surface contact and greater pressure can be used in the cutting operation than with other tools to force the work into the tool without causing it to "dig in". Thus the entire surface 22 of the front end of the tooth 20 is ground in a plane normal to the axis of the annulus and this permits of a single surface grinding operation for all of the teeth.

But this "surface contact" of the end of the tooth with the work is not over a considerable area. It extends only a little more than the length of the land 24 from the leading cutting edge of the tooth. Thus, as shown in Fig. 3, the back of the tooth is cut away as at 23, leaving the land 24, so that the contacting part of the end of the tooth extends, in the small cutter shown in Fig. 2, about a thirty-second of an inch. But with this construction the tool performs very differently from cutters having relieved end faces.

The land 24, that is, the cylindrical or arcuate inner surface of the tooth, from the forward or cutting edge 25 is at every point of its length circular in cross section, in that these lands are ground while rotating on the annulus axis as indicated at A. This inner land surface extends from the cutting edge 25 to the apex 26 of the angle formed by the cutaway back 23 of the tooth. If desired, these lands can be formed with a slight back taper as is usual with some cutting tools, however, in the preferred form of the invention, as illustrated in the drawing, such back taper is not shown.

From this description it will be seen that the cutting corner 21 of each tooth of the cutter is formed by a flat surface normal to the axial path of feed of the work and a cylindrical or substantially cylindrical surface parallel to or coincident with the rotary path of travel of the periphery of the work. Another way of describing the forms of the cutting ends of teeth is to say that they are conjugate to a figure formed by a line extending radially from and rotating about the axis of the annulus, and this line may be normal to the axis of the annulus or it may radiate therefrom at an angle to the annulus and it may be straight or it may be a curved line.

The side faces, that is the axial end faces 27, of the cutters may be finished normal to the axis of the annulus by a surface grinding operation as described in my Patent 2,087,231, issued July 20, 1937. The cutting ends of the teeth may also be relocated in this manner when they become worn.

The next operation is to grind the cutter teeth so that the lands are exactly formed as hereinbefore described. This operation, also, can be done on one annulus or on several at a time.

It will be seen that this invention provides for low cost cutting to reduce the circumferential surface of work and produces a finished surface which is relatively smooth. The cutter herein described can be formed and can be resharpened for a cost much less than the corresponding cost of cutters now used for the same purposes.

It will be understood that various forms of the invention other than those described above may be used without departing from the spirit or scope of the invention.

What I claim is:

1. A rotary cutter comprising a metal disk having teeth at the inner periphery thereof extending longitudinally of the axis, said disk having at its leading end a surface wholly in one plane to form with the tooth walls, cutting edges at the junction with one side of each of said teeth.

2. A rotary boring tool comprising a flat circular metal disk having parallel faces and having its inner periphery formed by alternate teeth and flutes, the leading end of each of said teeth being a flat surface coplanar with the leading end of every other tooth of the disk, said flat ends intersecting the forward faces of the teeth to form cutting edges, the peripheral face of each of said teeth forming a cylindrical land of small extent circumferentially, said lands being arcs about the axis of the disk.

3. A rotary cutter comprising a metal disk having teeth at the inner periphery thereof and extending axially, the ends of the teeth adjacent their peripheries being flat and in the same plane, said flat ends intersecting the forward faces of the teeth to form cutting edges, and the peripheral surfaces of each tooth forming a cylindrical land of small extent.

4. A rotary cutting tool for finishing cylindrical surfaces to the effective cutting diameter of the tool by relative axial displacement of the tool and work, comprising a disk having an opening therethrough, thereby providing internal and external surfaces, the inner one of said surfaces having flutes forming teeth spaced thereabout, said teeth being provided at their leading ends with flat surfaces and substantially radially extending cutting edges, said edges being formed by the intersection of the surfaces of said flutes and tooth ends, said flat surfaces and edges being coplanar with the face of the disk, so that said flat surfaces and said edges may equally and simultaneously contact the work to be operated upon.

5. A rotary cutting tool comprising a disk having flutes forming teeth spaced about the inner periphery of the disk and provided at the leading ends with flat surfaces and substantially radially extending cutting edges, said edges being formed by the intersection of the surfaces of said flutes and tooth ends, said surfaces and edges being coplanar with the face of the disk, so that said flat surfaces and said edges may equally and simultaneously contact the work to be operated upon.

6. A rotary cutting tool comprising a flat circular metal disk having parallel faces and having its inner periphery formed by alternate teeth and flutes, the leading end of each of said teeth having a flat surface coplanar with the corresponding face of said disk, and each said leading end having a substantially radially extending cutting end constituted by the intersection of said flat end surface and the wall of the adjacent flute whereby all of said edges are in a single plane.

7. A rotary cutter comprising a substantially cylindrical disk having teeth formed across its inner peripheral face, the cutting ends of said teeth on one side of the disk being in a common plane normal to the disk axis, the cutting corner of each tooth thus being formed by three intersecting surfaces, (a) the surface forming the leading face of the tooth, (b) the flat surface normal to the axial feed of the cutter, (c) the cylindrical surface parallel to or coincident to the rotary path of travel of the inner periphery of the cutter.

JOHN M. CHRISTMAN.